United States Patent [19]

Field et al.

[11] 3,989,801

[45] Nov. 2, 1976

[54] METAL NITRITO COMPOUNDS

[75] Inventors: Brian Orlando Field; Dilip Kumar Sanyal, both of London, England

[73] Assignee: The City University, London, England

[22] Filed: July 1, 1974

[21] Appl. No.: 485,015

[30] Foreign Application Priority Data
July 10, 1973  United Kingdom............... 32866/73

[52] U.S. Cl. ................................................ 423/385
[51] Int. Cl.$^2$......................................... C01B 21/20
[58] Field of Search..................................... 423/385

[56] References Cited
UNITED STATES PATENTS

| | | | |
|---|---|---|---|
| 792,515 | 6/1905 | Grossmann | 423/385 |
| 1,389,511 | 8/1921 | Johnstone | 423/385 |
| 1,970,950 | 8/1934 | Wise | 423/385 |
| 2,067,748 | 1/1937 | Zimmermann | 423/385 |
| 2,456,393 | 12/1948 | Duncan | 423/385 |

OTHER PUBLICATIONS

Yatsenko et al., "Luminescence of Sodium Nitrite at Low Temperatures," Izv. Akad. Nauk SSSR, Ser. Fiz. 27(5), 679–682 (1963).
Akmyradov, "Spectrophotometric Study of Nitrite Complexes of Lead," Uch. Zap., turkin, Gos. Pedagog Inst., Ser. Biol. – Georgr Nauk 1964, 254–258 (Russ).
"Inorganic Nitrates and Nitrate Compounds," Quarterly Reviews, 1964, vol. XVIII, No. 4.
Goodgame et al., Inorg. Chem., 1964, 3(10), p. 1389 et seq.

*Primary Examiner*—Earl C. Thomas
*Assistant Examiner*—Wayne A. Langel

[57] ABSTRACT

Novel metal nitrito compounds are provided having at least one nitrito group covalently bonded to at least one metal atom and characterized by being capable of reversibly forming additional compounds with molecular oxygen. The metal nitrito compounds are of general interest for carrying out chemical reactions.

13 Claims, No Drawings

METAL NITRITO COMPOUNDS

The present invention relates to nitrito compounds. There are known processes for preparing anhydrous metal compounds having at least one nitrate group ($NO_3$) covalently bound to at least one metal atom. (See, for example, an article entitled "Inorganic Nitrates and Nitrato Compounds," Quarterly Reviews, 1964, Vol. XVIII, NO. 4). In such processes, a metal, a metal halide, or a hydrated metal nitrate, for example, is reacted with for instance liquid dinitrogen pentoxide or a solution of liquid dinitrogen pentoxide in anhydrous nitric acid. Removal of liquid reaction media by vacuum evaporation allows the isolation of the anhydrous metal nitrato compounds. In most cases, these compounds may be purified by vacuum sublimation or distillation. It is believed that some of the anhydrous metal nitrato compounds may be characterized by the general formula:

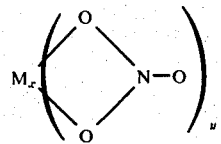

wherein $x$ and $y$ are integers. Preferably, when $x$ is 1, $y$ is 1 – 5, most preferably 2 to 4. M represents a metal atom, for example beryllium, copper, iron, tin, titanium, zirconium, mercury, zinc, aluminium, indium, vanadium, or hafnium. In theory, M can be any metal to the exclusion only of the lanthanides and alkali metals other than lithium. The lanthanides and alkali metals other than lithium are excluded because the atoms of these metals are too big to allow significant degree of covalency in the metal-to-nitrate bond.

Metal compounds containing the nitrito group (ONO) are also known. In these compounds the nitrito group appears to be covalently linked to the metal atom through one or more of its oxygen atoms. In all cases, the metal atoms in such compounds are also covalently linked to ligands other than the nitrito group, for example to pyridine or ethylenediamine. In particular, such compounds have been the subject of study by D. M. L. Goodgame and M. A. Hitchman (see, for example, Inorg. Chem., 1964, 3(10), 1389 and subsequent papers by these workers). Before the present invention was made, metal nitrito compounds in which the metal atom was covalently linked to no ligand other than the nitrito group were unknown.

It is an object of the present invention to provide new nitrito compounds.

The present invention provides metal nitrito compounds having at least one nitrito group covalently bonded to at least one metal atom and characterized by being capable of reversibly forming addition compounds with molecular oxygen.

One group of nitrito compounds of the invention has the general formula:

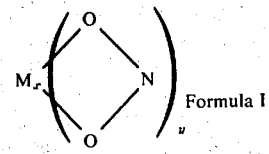

Formula I wherein M, $x$ and $y$ are as hereinbefore defined. It will be noted that this formula includes a nitrogen atom represented as being formally divalent. This is in accordance with present conventions relating to representation of compounds in which an inorganic group is covalently, rather than ionically, linked to a metal atom (as also in the formula given above for the nitrato compounds which includes a formally monovalent oxygen atom). In the solid state, the compounds of Formula I may be of polymeric structure with nitrito groups bridging two or more metal atoms.

A further group of nitrito compounds according to the invention are nitrosyl nitrito compounds of the general formula:

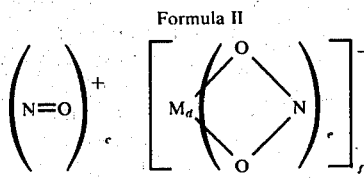

Formula II wherein M has the meaning given above and $c$, $d$, $e$ and $f$ are integers.

Another group of compounds according to the invention are nitronium nitrito compounds of a general formula similar to Formula II except that the nitrosyl group $(NO)^+$ is replaced by the nitronium group $(NO_2)^+$.

Examples of nitrito compounds according to the invention, for each group of the Periodic Table other than Groups IA, IIIA and VIB are as follows:

| Periodic Group | Examples of nitrito Compounds |
| --- | --- |
| II A | $Be(ONO)_2$; $Be_4O(ONO)_6$. |
| IV A | $Ti(ONO)_4$; $TiO(ONO)_2$; $Zr(ONO)_4$; $No_2^+[Hf(ONO)_5]^-$ |
| V A | $VO(ONO)_3$; $NbO(ONO)_3$ |
| VI A | $Cr(ONO)_3$; $CrO_2(ONO)_2$ |
| VII A | $Mn(ONO)_2$ |
| VIII | $Fe(ONO)_3$; $NO^+[Fe(ONO)_4]^-$; $Pd(ONO)_2$ |
| IB | $Cu(ONO)_2$ $Au(ONO)_3$ |
| II B | $Zn(ONO)_2$ $Hg(ONO)_2$ |
| III B | $Al(ONO)_3$ $In(ONO)_3$ |
| IV B | $Sn(ONO)_4$ |
| V B | $Bi(ONO)_3$ |
| VII B | $F(ONO)$ ; $Cl(ONO)$ ; $I(ONO)$ ; $I(ONO)_3$ |

This list is not intended to be comprehensive but to illustrate the types of simple nitrito Compounds by Periodic Groupings.

The metal nitrito compounds of the invention may be produced in a few cases by careful pyrolysis of the corresponding nitrato compounds but this route tends to give poor yields and to involve difficulties in effecting separation of the desired nitrito compound from other products of pyrolysis.

The metal nitrito compounds of the invention may also be produced by reaction of the metal or an oxide, hydroxide, salt or other compound thereof with dinitrogen trioxide in the substantial absence of free oxygen and under substantially anhydrous conditions, if desired in the presence of an activating solvent, for example nitromethane or ethyl acetate.

In general, however, the best method known at the present time for forming the metal nitrito compounds is by reacting a metal nitrato compound with a reducing agent, the reaction being effected in the substantial absence of free oxygen under substantially anhydrous conditions, the term "substantially anhydrous" denoting herein conditions in which the amount of water present is insufficient to cause an unacceptable degree of hydrolysis of the nitrato compound which is the starting material or the nitrito compound being produced.

Thus, according to one aspect of the present invention, there is provided a process for preparing an anhydrous metal nitrito compound, comprising reducing, under substantially anhydrous conditions and in the substantial absence of free oxygen, an anhydrous metal nitrato compound to an anhydrous metal nitrito compound.

Preferably, the reduction is carried out by means of divided metal. For this purpose, divided metals known to be suitable for carrying out reduction processes may be used. For example, the metal nitrato compound may be heated with an excess of powdered metal corresponding to the metal in the nitrato compound (though this may not be economically practical in the case of metals such as titanium and zirconium which are not readily obtainable in finely divided form); or the metal nitrato compound may be heated with powdered zinc metal. Convenient reaction conditions are reaction temperatures in the range 50° to 150° C, and reaction pressures in the range $10^{-1}$ or $10^{-4}$ mm Hg. These pressures are not critical; they are conveniently chosen so as to facilitate isolation of volatile products. In this respect, the divided metal should preferably have involatile nitrato or nitrito derivatives, so as to avoid or reduce the possibility of producing a mixture of volatile metal nitrogen-containing products. It is usually found that the nitrito derivative is more volatile than the nitrato derivative. Thus, the reaction temperatures and pressures may be chosen such that the resultant metal nitrito compound is volatile, and may be volatilised from the reaction mixture and condensed to give the isolated anhydrous metal nitrito compound. Although zinc is a preferred metal for carrying out the reduction, other metals may be preferred according to the circumstances of the required reduction, for example divided lead and divided iron are alternatives to divided zinc.

Although reduction of the metal nitrato compound with a divided metal has up to now been the most effective method for producing the compounds of the invention, other reducing agents can evidently be employed such as alkali metal nitrites, carbon monoxide and nitric oxide, although caution should be exercised with regard to the possibility that the reducing agent may irreversibly form an adduct with the product; for example, carbon monoxide may do so. Hydrogen gas may be an effective reducing agent in some cases provided that the conditions are such as to remove water produced by the reducing reaction quickly enough from the reaction zone to maintain the reaction zone in a substantially anhydrous state. Gaseous reducing agents comprising unsaturated hydrocarbons, especially alkenes, can also be used if precaution is taken to avoid accumulation of water in the reaction zone. In particular, it has been found that in a case where reaction of a nitrato compound with a divided metal leads to incomplete reduction of the nitrato compound, the reduction reaction can be completed by flowing a stream of propylene or other gaseous alkene over the reaction mixture while continuing heating of that mixture.

The structure of the metal nitrito compound produced depends mainly on the structure of the metal nitrato compound from which it is obtained and also on the reaction conditions. The simplest reaction is one in which a metal nitrato compound containing only nitrato groups covalently bonded to only a single metal is reduced to convert all the nitrato groups into nitrito groups, thereby yielding compounds of Formula I. When only partial reduction of the nitrato groups takes place compounds containing both nitrito and nitrato groups are obtained. An example of such a compound is mononitrito mononitrato copper. The extent to which full or only partial reduction is achieved depends on the reaction conditions and mixtures of products may in some cases be obtained.

Compounds of Formula II or the corresponding nitronium compounds are produced by complete reduction of the nitrato groups of a metal nitrato compound which is a nitrosyl or nitronium nitrato compound. For example, complete reduction of nitrosyl tetranitrato iron III gives nitrosyl tetranitrito iron III. Incomplete reduction would give a mixed nitrato compound, for example nitrosyl dinitrito dinitrato iron III.

As indicated above the preferred method of separating the metal nitrito compounds from the reaction mixture is by selective sublimation. The separation is not always easy and may require careful control of the temperature and pressure under which sublimation is carried out, for example in the isolation of nitrosyl tetranitrito iron III from the starting material nitrosyl tetranitrato iron III, the latter tending to sublime with the nitrito derivative.

When complete reduction of a metal nitrato compound with a reducing gas is feasible no problem of separation is encountered since the residue may consist entirely of the desired metal nitrito product but this can not often be achieved.

Separation of the nitrito compounds by solvent extraction techniques has not as yet been very successful since the metal nitrito compounds tend to form covalent compounds with the solvent and are then difficult to recover. However it is possible that more inert solvents could be used with greater success.

The metal nitrito compounds of the invention have U.V. spectra which characteristically display the absorption due to the nitrito group at 223 m$\mu$ to 235 m$\mu$. They are crystalline materials which usually sublime without substantial decomposition within a temperature range of from about 70° C to about 150° C and within a pressure range of $10^{-1}$ to $10^{-3}$ Torr. Other distinguishing physical characteristics are that their infra-red spectra display frequencies characteristic of a covalently bonded nitrito group. In contrast with the nitrato compounds, the addition of a nitrito compound of the invention to an oxygen-free solution of potassium permanganate will decolorise the solution.

The most striking chemical characteristic of the compounds of the invention is that they are capable of forming addition compounds with oxygen. The oxygenated nitrito compound is stoichiometrically identical with the corresponding nitrato compound (and can sometimes be converted into it by exposure to U.V.

radiation) but differs from it chemically in being able to release the added oxygen, either as oxygen gas or in the course of a chemical reaction in which it acts as an oxidising agent.

The oxygenated nitrito compound can be formed by reaction of the nitrito compound with free oxygen, e.g., from air, or oxygen gas.

In some cases the nitrito compounds of the invention may also form addition compounds with materials other than oxygen. Thus, it is to be expected on thermodynamic principles that they will form addition compounds with any unsaturated organic molecule, subject to steric limitations. Formation of addition compounds with gaseous nitrogen is also possible but this takes place very slowly. Moreover, since many coordination compounds which reversibly pick up oxygen also reversibly pick up hydrogen, it is possible that addition compounds with hydrogen may be obtainable.

Anhydrous metal nitrito compounds of the present invention will be of general interest for carrying out chemical reactions. Thus, as indicated in more detail below, these compounds have potentially important applications, especially in effecting oxidation reactions by virtue of their ability to form adducts with gaseous oxygen and then to release oxygen from such adducts.

A preferred application of the metal nitrito compounds of the present invention is a process for oxidising organic material, comprising contacting said organic material with a gas comprising free oxygen, in the presence of at least one anhydrous metal nitrito compound. The gas comprising free oxygen may be air or other suitable gas, for instance oxygen itself. The contacting may be carried out in any suitable way under any suitable reaction conditions, for example at room temperature and atmospheric pressure. The organic material may be used in gaseous or liquid phase. For example, gaseous organic material may be passed into an anhydrous liquid vehicle comprising at least one metal nitrito compound. Alternatively, as a further example, the contacting may be brought about by means of a fluidized bed technique. In general, said at least one anhydrous metal nitrito compound may be supported by or be present in any suitable vehicle, so as to facilitate said contacting. For example, at least one metal nitrito compound may be supported on or by any suitable inert solid material known for use as a support in catalytic oxidation reactions. An example of said at least one nitrito compound being present in an anhydrous liquid vehicle is a dispersion (for instance a suspension) of the nitrito compound or compounds in an anhydrous liquid vehicle comprising at least one non-polar halohydrocarbon and/or at least one non-polar halocarbon. A preferred non-polar halohydrocarbon is chloroform or a fluorohydrocarbon. The fluorohydrocarbons are especially useful because oxygen has a high solubility in these solvents. A preferred non-polar halocarbon is carbon tetrachloride. Preferably, said anhydrous liquid vehicle is inert or substantially inert to the nitrito compound or compounds.

Examples of organic materials which may be oxidized in accordance with the present invention are saturated hydrocarbons or unsaturated hydrocarbons. Saturated hydrocarbons in the form of alkanes or cycloalkanes are readily available in the petroleum industry. Natural gas is also a convenient source of alkanes.

The anhydrous metal nitrito compounds will allow saturated hydrocarbons to be oxidized to alcohols. For example, normal pentane will be oxidized at room temperature and at atmospheric pressure in the presence of a gas comprising oxygen and an anhydrous metal nitrito compound (for instance $NO^+[Fe(ONO)_4]^-$) to give the corresponding primary alcohol n.amyl alcohol.

Unsaturated hydrocarbons, especially those comprising ethylenic unsaturation, are also readily available in the petroleum industry. The anhydrous metal nitrito compounds will allow alkenes to become oxidized by the introduction of epoxy rings into the alkenes. For example, normal propene will be oxidized in the presence of a gas comprising oxygen and an anhydrous metal nitrito compound (for instance $NO^+[Fe(ONO)_4]^-$) to give the corresponding epoxide, propylene oxide.

As an alternative to carrying out catalytic oxidations, various addition compounds may be prepared from the anhydrous metal nitrito compounds. An example of this has already been given above, in describing the preparation of an oxygen addition compound with oxygen. Another example, is a process for preparing an addition compound, comprising contacting an anhydrous metal nitrito compound with an alkene to give an addition compound of the nitrito compound and the alkene. This addition compound might serve as a precursor for a polymer derived from the alkene.

It is evident that the ability of the metal nitrito compounds of the invention easily to form addition compounds with oxygen but only slowly, if at all, to form such compounds with nitrogen permits these compounds to be used for separating oxygen from air. After forming the oxygen addition compound by contacting the metal nitrito compound with air under suitable conditions, the addition compound can then be decomposed by vacuum pumping to yield free oxygen. This procedure is potentially useful as a means for obtaining oxygen from air in circumstances where conventional procedures for doing so are inconvenient or uneconomic. It may also be useful in separation of oxygen isotopes since the reaction involved is so readily reversible.

The conversion of the nitrito compounds of the invention into their oxygenated form can in general simply be effected by exposure of the compounds to a substantially anhydrous atmosphere containing free oxygen, for example air or oxygen. On a laboratory scale this is conveniently effected by storing the compounds overnight in dry oxygen.

The infra-red spectra of the oxygenated nitrito compounds are similar to those of the unoxygenated compounds but the magnetic susceptibility differs and the U.V. solid reflectance changes, presumably owing to charge transfer interaction with the metal. It appears from such data that the oxygen is probably added to the metal atom of the nitrito compound rather than to the nitrogen atom of the nitrito group.

Particulars of observed metal/oxygen ratios (as determined by chemical analysis) in the oxygenated materials and the solid state ultra-violet absorption bands are given in Table I.

TABLE I

| Compound | Formal metal charge | Metal:Oxygen M/O$_2$ ratio | Solid reflectance u.v. M(ONO)$_r$ | Solid reflectance u.v. M(ONO)$_r$.yO$_2$ |
|---|---|---|---|---|
| Cu(ONO)$_2$ | Cu$^{2+}$ | 1:1 | 223 m$\mu$ | 225–227 m$\mu$ |
| Zn(ONO)$_2$ | Zn$^{2+}$ | 1:1 | 223–5 m$\mu$ | 225–227 m$\mu$ |
| Hg(ONO)$_2$ | Hg$^{2+}$ | 1:1 | 223 m$\mu$ | 228 m$\mu$ |
| NO$^+$[Fe(ONO)$_4^-$] | Fe$^{3+}$ | 1:2 | 230–35 m$\mu$ | 235–238 m$\mu$ |
| Zr(ONO)$_4$ | Zr$^{4+}$ | 1:2 | 235 m$\mu$ | 239–240 m$\mu$ |

In the case of Cu(ONO)$_2$ and also in the other divalent metal nitrito complexes it was found that one molecule of oxygen was added reversibly; but the iron and zirconium complexes were associated with two molecules of oxygen per molecule of nitrito compound. These compounds are unique in the field of reversible oxygenation, in as much as no other compounds have yet been made which form reversible adducts with greater than one molecule of oxygen per metal atom.

The invention will now be illustrated by the following Examples.

EXAMPLE 1

Hydrated titanium hydroxide was dissolved at room temperature and atmospheric pressure in liquid dinitrogen pentoxide in excess. The excess of liquid dinitrogen pentoxide and anhydrous nitric acid so produced was subsequently removed by vacuum pumping at 10$^{-2}$ mm Hg and 20° C to yield tetranitrato titanium. This was purified by vacuum sublimation at a pressure of 10$^{-2}$ mm Hg and temperature in the range 80° to 110° C. The purified titanium compound had the formula Ti(NO$_3$)$_4$.

The purified tetranitrato titanium was anhydrous. It was utilized by mixing it intimately with dry zinc powder in a dry atmosphere. The mixture was then heated at 80° C and 10$^{-2}$ mm Hg to cause the tetranitrito titanium compound to sublime out in a highly pure form. This compound was condensed in a water cooled "cold finger" condenser suspended above the heated solid mixture. The condensed tetranitrito compound was removed from the condenser, and bottled in an atmosphere of an inert gas, argon being convenient.

In the above preparation of tetranitrato titanium, hydrated titanium hydroxide was used. If desired, the hydrated oxide, hydrated nitrate, or other salt of titanium could have been utilised instead.

EXAMPLE 2

Tetranitrato zirconium, Zr(ONO$_2$)$_4$, was first prepared, by a procedure analogous to that described in Example 1 for the preparation of tetranitrato titanium, and then converted into tetranitrito zirconium, by heating it with dry zinc powder at 80° C and 10$^{-2}$ mm Hg. The tetranitrito zirconium formed was sublimed and condensed on a cooled surface, as in Example 1. Hydrated zirconium hydroxide, hydrated zirconium oxide, or another zirconium salt were suitable starting materials for the preparation of the tetranitrato compound-cf. titanium starting materials in Example 1.

EXAMPLE 3

Ferric hydroxide was dissolved at room temperature and atmospheric pressure in an excess of liquid dinitrogen pentoxide. (Anhydrous ferric chloride or clean iron wire can be used in place of ferric hydroxide if desired). The excess dinitrogen pentoxide was subsequently removed by vacuum pumping as in Example 1 to yield nitrosyl tetranitrato iron III which was purified by vacuum sublimation as in Example 1. The presence of the nitrosyl group was confirmed by examination of the infra-red absorption spectrum of the product which displayed the strong band at 2355 cm$^{-1}$ which is characteristic of the nitrosyl group.

The nitrosyl tetranitrato iron III was mixed with powdered iron in a dry atmosphere and heated at 80° C and 10$^{-1}$ mm Hg. The product, which sublimed and was condensed on a cooled surface, was nitrosyl tetranitrito iron III, the presence of the nitrosyl group being confirmed by the infra-red absorption spectrum.

EXAMPLE 4

About 1 gram of copper flakes was taken in a side armed reaction tube and just covered with dry (dried over molecular sieve 4A) nitro methane. The reaction tube was then immersed into a Dewar flask containing liquid nitrogen, and di-nitrogen trioxide vapour from a cylinder was passed into the tube and the flow was continued for some time. Dinitrogen trioxide slowly condensed into the tube as a bluish-white solid. The flow was then discontinued and the well stoppered reaction vessel fitted with a pressure release device, was allowed to warm up to room temperature (20° C). (Care must be taken so that the reactants do not warm up very quickly and bump). The solid dinitrogen trioxide melted to a deep blue liquid, which dissolved in the nitromethane; the reaction then started and the reaction mixture was left overnight at room temperature to complete the reaction. On completion of the reaction excess liquids were removed by slow evaporation on a vacuum line (10$^{-2}$mm Hg.). The perfectly dry solid reaction product, after analysis (which showed it to be an adduct of nitromethane and dinitrogen trioxide with dinitrito copper), was next sublimed onto a water cold finger at 120° C/10$^{-2}$ mmHg. Blue-green crystals of dinitrito copper condensed on the cold finger. Care was taken at all operations to exclude air and moisture from the product, which was kept under dry nitrogen.

EXAMPLE 5

The anhydrous compound NO$^+$[Fe(NO$_3$)$_4$]$^-$(nitrosyl tetranitrato iron III) was placed in a porcelain boat in a glass tube which was first purged with dry nitrogen and then dry nitric oxide was passed through. No reaction was apparent at room temperature, but on heating to 80° C brown fumes were produced. The reaction was continued until the production of brown fumes ceased. The solid product from the porcelain boat was analysed by the permanganate titration method which indicated that the product had a reducing power equivalent to the presence of a 64.3% nitrito content, though the product was not further characterized by other tests.

The physical data for a few nitrito compounds of the invention are set out in Table II.

TABLE II

Physical properties of $Cu(ONO)_2$; $Zn(ONO)_2$; $Hg(ONO)_2$; $NO^+[Fe(ONO)_4]^-$ and $Zr(ONO)_4$

| Compounds with colour | Melting point °C | Density at 20°C g/c.c. | Volatility °C/$10^{-2}$ mm Hg | Unit cell symmetry and dimensions | Specific infrared frequencies $cm^{-1}$ |
|---|---|---|---|---|---|
| $Cu(ONO)_2$ Blue-green | 147–149 | 2.65 – 2.68 | Sublimes at 80 | tetragonal unit cell a=b=9.091A c=11.365A | 1525,1440$v$ass 1090,1020$v$sym 805$\delta$-$NO_2$ |
| $Zn(ONO)_2$ yellowish white | — | — | Not volatile up to 180 | — | 1665,1460$v$ass 1038,1022$v$sym 805 $\delta$-$NO_2$ |
| $Hg(ONO)_2$ yellowish white | Decomposes 65 | — | 60–65,d | — | 1770,1480$v$ass 1090,1028$v$sym 795 $\delta$-$NO_2$ |
| $NO^+Fe(ONO)_4^-$ Red-brown | 90–91 | 2.08 | 70 | orthogonal a=8.446 A b=10.790 A c=13.619 A | 2370,2355 $NO^+$ 1605,1570,1420 ass 1090,1010 $v$sym 795 $\delta$-$NO_2$ |
| $Zr(ONO)_4$ white | Decomposes 135 | 1.99 | 90 | tetragonal a=b=12.325A c=17.658 | 1605,1575$v$ass 1080,1020$v$sym 800 $\delta$-$NO_2$ |

EXAMPLE 6

The anhydrous nitrito compound $NO^+[Fe(ONO)_4]^-$ was mixed onto glass wool in a dry, inert atmosphere. The glass wool was then compressed into a porous plug. The plug was mounted in a housing, and a slow stream of oxygen gas saturated with normal pentane vapour was passed through the plug at room temperature and atmospheric pressure. The gaseous products obtained were passed through a trap cooled to −50° C. n.Amyl alcohol and some unconverted normal pentane condensed out into the trap. These two materials were separated from each other by selective vaporization. The n. amyl alcohol was identified by conventional analysis utilizing gas/liquid chromatography and infrared spectroscopy.

EXAMPLE 7

The anhydrous nitrito compound $NO^+[Fe(ONO)_4]^-$ was suspended in anhydrous carbon tetrachloride liquid at 20° C. A gaseous mixture of oxygen and n. propene (i.e., n.propylene), comprising 1.5 parts by volume of oxygen to 1.0 part by volume of n. propene, at atmospheric pressure was passed through the suspension. Propylene oxide and unconverted propene were identified in the carbon tetrachloride solution. The gaseous products leaving the suspension were passed through a trap cooled to −50° C. Propylene oxide and some unconverted n. propene condensed out into the trap. These two materials were separated from each other by selective vaporization. The propylene oxide was identified by conventional analysis utilizing gas/liquid chromatography and infrared spectroscopy.

EXAMPLE 8

300 mg of oxygenated dinitrito copper (produced by storing dinitrito copper under oxygen overnight) was mixed and distributed on glass wool in a glass reactor. A mixture of methane and oxygen (in a 1:1 volume ratio) was passed through the reactor at ambient temperature and pressure. The exit gases were bubbled through a catchpot containing carbon tetrachloride, which was sampled from time to time for chromatographic analysis. No methanol was detected initially. The reactor was warmed to 40° C and the analyses then indicated an increasing proportion of methanol in the catchpot. The product was also confirmed as methanol by infrared analysis.

EXAMPLE 9

100 mg of an oxygenated mixture of nitrosyl tetranitrito iron III (34 weight %) and nitrosyl tetranitrato iron III were distributed on glass wool in a glass reactor tube. This mixture had been produced by exposure to oxygen of the unpurified reaction product of reducing the nitrato compound with iron as described in Example 3. On passing a rapid stream (approximately 200 mls min$^{-1}$) of propylene through the reactor a rapid exothermic reaction took place with the production of some brown fumes. The reactor was then swept through with oxygen at ambient temperature for 30 minutes after which a mixture of propylene (14 mls min$^{-1}$) and oxygen (7 mls min$^{-1}$) was passed through at ambient temperature and the exit gases were bubbled through a catchpot containing carbon tetrachloride. After 50 minutes reaction time the catchpot analyses showed a yield of 19.2 mols propylene oxide per mol of catalyst. At this point the run was stopped and the reactor washed through with carbon tetrachloride. The propylene oxide found in these washings was equivalent to 44.8 mols per mol of catalyst.

EXAMPLE 10

200 mg of powdered oxygenated nitrosyl tetranitrito iron III were distributed on glass wool in a glass reactor tube. A mixture of propylene (14 mls min$^{-1}$) and oxygen (7 mls min$^{-1}$) at atmospheric pressure was passed through the reactor at ambient temperature and the exit gases bubbled through a cooled catchpot containing 10 ml of carbon tetrachloride. After 120 minutes a sample from the catchpot was analyzed on a chromatograph and found to contain over 4.6 volume % of propylene oxide. This figure is equivalent to a yield of 8 mols of propylene oxide per mol of catalyst.

What is claimed is:

1. Metal nitrito compounds having at least one nitrito group covalently bonded to at least one metal selected from the group consisting of lithium and metals of Groups IIA, IVA, VA, VIA, VIIA, VIII, IB, IIB, IIIB, IVB, and VB of the Periodic Table and to no ligand other than a nitro group or a nitrato group, said nitrito compounds being capable of reversibly forming addition compounds with molecular oxygen and having a U.V. spectra with an absorption band at 223–235 m$\mu$.

2. The compounds of claim 1 of the general formula:

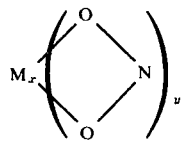

wherein M is a metal and $x$ and $y$ are integers.

3. The compounds of claim 2 wherein $x$ is 1 and $y$ is an integer from 1 to 5.

4. The compounds of claim 2 wherein M is Be, Cu, Fe, Sn, Ti, Zr, Hg, Zn, Al, In, V or Hf.

5. The compounds of claim 1 wherein said nitrito group is covalently bonded to a metal atom which also has covalently bonded thereto at least one nitrato group.

6. The compounds of claim 5 of the general formula:

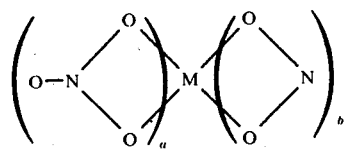

wherein M is a metal and $a$ and $b$ are integers.

7. The compounds of 1 wherein the metal is a transition metal.

8. Oxygen addition compounds formed by addition of molecular oxygen to the nitrito compounds of claim 1.

9. Tetranitrito titanium.

10. Tetranitrito zirconium.

11. Nitrosyl tetranitrito iron III.

12. Dinitrito copper.

13. Mononitrito mononitrato copper.

* * * * *

UNITED STATES PATENT AND TRADEMARK OFFICE
CERTIFICATE OF CORRECTION

PATENT NO. : 3,989,801
DATED : November 2, 1976
INVENTOR(S) : Brian Orlando FIELD and Dilip Kumar SANYAL It is certified that error appears in the above-identified patent and that said Letters Patent are hereby corrected as shown below:

Column 10, line 65, insert -- said metal being covalently bonded -- before "to";

Column 10, line 66, change "nitro" to -- nitrito --.

Signed and Sealed this twenty-third Day of August 1977

[SEAL]

Attest:

RUTH C. MASON
Attesting Officer

C. MARSHALL DANN
Commissioner of Patents and Trademarks